United States Patent [19]
Steckler

[11] 3,878,175
[45] Apr. 15, 1975

[54] HIGHLY ABSORBENT SPONGY POLYMER MATERIALS

[75] Inventor: Robert Steckler, Crofton, Md.

[73] Assignee: Plastik Devices, Inc., Briarcliff Manor, N.Y.

[22] Filed: July 27, 1973

[21] Appl. No.: 383,275

[52] U.S. Cl. ....... 260/78.5 BB; 128/296; 260/2.5 N; 260/29.1 R; 260/80.72; 260/86.1 N; 260/86.1 R
[51] Int. Cl. ..................... C08f 19/00; C08f 19/10
[58] Field of Search....... 260/78.5 BB, 80.72, 2.5 N, 260/29.1 R, 86.1 R, 86.1 N; 128/296

[56] References Cited
UNITED STATES PATENTS

| | | | |
|---|---|---|---|
| 3,532,679 | 10/1970 | Steckler | 260/80.72 |
| 3,699,089 | 10/1972 | Wichterle | 260/86.1 R |
| 3,721,657 | 3/1973 | Seiderman | 260/80.72 |
| 3,787,380 | 1/1974 | Stamberger | 260/80.72 |
| 3,792,028 | 2/1974 | Seiderman | 260/80.72 |

*Primary Examiner*—Joseph L. Schofer
*Assistant Examiner*—Herbert J. Lilling
*Attorney, Agent, or Firm*—Henry B. Kellog

[57] ABSTRACT

Highly absorbent spongy polymer materials are obtained by simultaneously copolymerizing and partially cross-linking a comonomer mixture of an alkyl acrylate and a heterocyclic N-vinyl monomer containing a carbonyl functionality, and a cross-linking agent in the presence of a hydrophobic liquid diluent in which the final polymer is insoluble and which will not materially swell the final resultant polymer in the presence of a free-radical catalyst at 35° – 60° C. and in the absence of atmospheric oxygen until a slightly gelled mass is obtained, followed by continued heating in an inert atmosphere to a temperature of about 100° C. for a period of time of ½ – 3 hours to yield an opaque self-supporting mass. The latter mass is immersed in water and allowed to swell and the water insoluble (hydrophobic) diluent is allowed to separate or is removed from its pores by squeezing. The resulting water-swelled gel can be dried to form a non-tacky sponge and re-swelled by immersion in water repeatedly, if desired.

12 Claims, No Drawings

HIGHLY ABSORBENT SPONGY POLYMER MATERIALS

It is known that sparingly cross-linked polymeric hydrogels, i.e., hydrophilic three-dimensional polymer networks, can be prepared by several methods. For the preparation of such hydrophilic gels, the acceptable method consists of simultaneously polymerizing a monomeric acrylic acid ester or methacrylic acid ester in which the ester moiety contains one or more hydrophilic groups, such as hydroxy, and cross-linking the monomer as its polymerizes with a cross-linking agent such as a polyethyleneglycol dimethacrylate in the presence of a redox initiator at a temperature of about 50°C. for a period of time sufficient to yield the desired hydrogel. Depending upon the polymerization method employed, the characteristics of the hydrogels will differ. For example, by the bulk polymerization procedure, the product is a hard and brittle resin swellable in water to the point of becoming a soft gel. The maximum water content in the resulting gel is around 37.5 percent.

When water is employed as the solvent for the co-polymerization of the monoester, such as, for example, 2-hydroxyethyl methacrylate (containing about 0.4 percent dimethacrylate and about 3 percent methacrylic acid,) and polyethylene glycol dimethacrylate with a free radical catalyst initiator system, the polymer may precipitate out of the monomer solution as the polymerization proceeds to yield a slimy gel. The maximum amount of water that is retained by the opaque gel is about 40 percent. The water invariably reduces the molecular weight and the degree of cross-linking inherent in the comonomer system, and may lead to a gelatinous aqueous polymer dispersion of little practical value. However, when the same monomer; i.e., 2-hydroxyethyl methacrylate as above constituted, is polymerized and cross-linked with 0.3 to 1.6 percent of tetraethyleneglycol dimethacrylate in an ethylene glycol/water system with persulfate-bisulfite initiator, a polymer is obtained which is converted to a transparent gel upon equilibration in water. The maximum amount of water which can be retained in the transparent gel is about 43 percent.

From the foregoing procedures, which are described in more detail by M. F. Refojo and H. Yasuda, Journal of Applied Polymer Science, Vol. 9, pages 2425–2435 (1965), and by Otto Wichterle in U.S. Pat. Nos. 2,976,576 and 3,220,960, it becomes clearly evident that to prepare hydrophilic three-dimensional polymer networks (hydrogels,) it is essential that a water soluble monoester of acrylic or methacrylic acid and of a polyfunctional alcohol having an esterifiable hydroxy group be employed in the simultaneous polymerization and cross-linking with ethylene glycol dimethacrylate or polyethylene glycol dimethacrylate at temperatures ranging about 50° to 80° C.

It is also known that N-vinyl lactams, especially N-vinyl-2-pyrrolidone, can be polymerized by adding to an aqueous solution of the monomer, containing from 0.01 to 0.33 percent by weight of cross-linking agent such as ferric chloride, a sufficient quantity of catalyst such as 35% aqueous hydrogen peroxide and an activator such as ammonium hydroxide to yield from colorless to yellow gels of rubber-like consistency of an ordinary laboratory rubber-stopper. The resulting gels are not permeable to water and hence cannot be considered as hydrogels. If the gel of rubber-like consistency is heated to remove the small quantity of water present therein, a hard, opaque and glassy product is obtained which is insoluble in water and in all common classes of organic solvents. In short, the gels of rubber-like consistency are water insoluble and water unswellable polymers of N-vinyl-2-pyrrolidone or whatever other N-vinyl lactam that is employed in the polymerization and cross-linking reactions. In view of their insolubility in water and in all common organic solvents and their incapability of swelling in water, the gels are not hydrophilic three-dimension polymer networks (hydrogels) as obtained by the procedures described in the aforementioned references.

The preparation of hydrogels from cross-linked polymers of N-vinyl lactams and alkyl acrylates is described in the Robert Steckler U.S. Pat. No. 3,532,679, of Oct. 6, 1970. This patent teaches that N-vinyl lactams and alkyl acrylates can be simultaneously copolymerized and cross-linked by the bulk polymerization method, in a water system, or in the presence of water soluble organic solvents, such as ethanol, etc. When N-vinyl-2-pyrrolidone, methyl acrylate, tetraethyleneglycol dimethacrylate, together with the usual catalyst, are co-polymerized and cross-linked by the bulk method; i.e., in the absence of a liquid reaction medium, a clear, colorless and rigid sheet having an appearance comparable to "Plexiglass" is obtained. It is non-tacky and limited in swelling in the water. When the same reactants are copolymerized and cross-linked in a water system, a clear, very tacky, soft and rubbery gel is obtained. The rubbery gel is due to the swelling of the polymer in water which was used as the polymerization medium. When the gel is dried at 100° C., a clear, hard and rigid sheet is obtained. The same clear, tacky, soft and rubbery gel is obtained when ethanol or other water soluble organic solvent is used as the polymerization medium.

To provide a new class of highly absorbent spongy polymer materials which are adaptable for industrial applications, human use in toiletry and as sterile surgical dressings for sponging, wiping or absorbing pus, blood and other body fluids during surgical operations constitutes the principal object of the present invention.

Other objects and advantages will become evident from the following description.

In attaining the foregoing objects, I have found that highly porous or spongy polymeric materials characterized by swelling in water, body fluids, industrial aqueous solutions, etc., and by being soft when wet and retaining their toughness, are readily obtained by first simultaneously copolymerizing and partially cross-linking a mixture or blend of comonomers consisting of from 30 to 90 percent by weight of a heterocyclic N-vinylmonomer, containing a carbonyl functionality adjacent to the nitrogen in its heterocyclic moiety, 10 to 70 percent by weight of one or more acrylate monomers and from about 0.5 to about 12 percent by weight of a polyethylene glycol dimethacrylate, as crosslinking agent, and from about 0.05 to about 3.0 percent by weight (preferably about 0.4 percent – 0.8 percent by weight) of a free radical catalyst in the presence of a hydrophobic liquid diluent, such as a saturated, aliphatic liquid hydrocarbon having a boiling point above 60°C., preferably from about 110° to about 330° C., such as, for example, n-hexane, n-heptane, 2, 4 dimethylhexane, n-octane, n-nonane, n-undecane, n- tridecane, n-nonadecane, n-tetracosane, and the like, including the viscous, water-white, tasteless mineral oils that are widely sold for pharmaceutical purposes, under a variety of names; i.e., liquid paraffin, liquid petrolatum, paraffin oil, mineral oil and many special trade or brand names. Other suitable diluents include aromatic or cyclic compounds, such as toluol, xylol, terphenyls, tetralin, decalin, trichloroethane, o-dichlorobenzene, nitroparaffins, nitrobenzene, dibutyl ether, butyl acetate, etc. The mixture may be polymerized directly in a casting cell, or it may be prepolymerized by stirring or agitating the resulting mixture or blend while heating to about 35° – 60° C., preferably to about 50° C., for a period of time until a viscous, opaque or translucent, slightly gelled mass is obtained. The purpose of the stirring or agitating is to prevent the phase separation of the gelled polymer mass as it is formed from the liquid diluent. After the reaction mass is sufficiently gelled, usually between one to six hours, it is poured into conventional polymerization trays or glass casting cells, or if desired, into molds conforming to the desired shape of the polymer material, and the copolymerization and cross-linking completed in an inert atmosphere; i.e., in the absence of oxygen or in the presence of nitrogen, by gradually raising the temperature to about 100° C. The final reaction is maintained at this temperature for a period of ½ to 3 hours to achieve full or substantially complete cross-linking. The final copolymerization and cross-linking may be conducted in a closed system, such as an autoclave, under pressure of, e.g.; from 10 to 150 psig in the presence of nitrogen so as to prevent evaporation losses of the reactants; i.e., the comonomers, diluent, etc.

The resulting opaque and porous polymeric material is immersed in water and allowed to swell. The hydrophobic diluent present in the formed polymeric material is gradually displaced by water. Rapid and complete removal or displacement of the diluent by the water can be greatly accelerated by passing the polymeric material through oppositely rotating soft rubber squeeze rolls submerged in water many times as is required to completely remove the diluent which separates from the water, and is replaced in the porous polymeric material by water. The diluent may also be removed; i.e., displaced by water, by mechanical intermittent squeezing devices that are submerged in water and through which the polymeric material is intermittently passed through. The polymeric material may be submerged in water and squeezed by hand until the diluent is removed.

After the diluent has been removed, the water soaked spongy material is squeezed by hand or passed through rollers to remove as much of the water as possible and then dried in an air oven at about 100° C. for several hours until dry. The dried material may be cut or otherwise fabricated into various sizes and shapes. It may be cut into thin sheets or films.

The dried spongy polymer materials readily swell upon immersion in water or in aqueous solutions of inorganic or organic substances up to a water content of 30–96 percent yielding hydrogels which have excellent shape or body form retaining characteristics, and which may be clear, or hazy, or translucent, or opaque, depending on their monomer composition.

The free radical catalyst that is employed in the simultaneous copolymerization and partial cross-linking may be any one of the well known organic peroxides, azobisisobutyronitrile, or the like.

As examples of heterocyclic N-vinyl monomers containing a carbonyl functionality adjacent to the nitrogen in its heterocyclic moiety that are copolymerized with the alkyl acrylate, the following are illustrative: N-vinyl-2-pyrrolidone, N-vinyl-2-piperidone, N-vinyl-E. caprolactam, N-vinyl succinimide, N-vinyl-diglycolimide, N-vinyl glutarimide, N-vinyl-3-morpholinone, N-vinyl-5-methyl-3-morpholinone, etc.

The alkyl acrylates, or methacrylates; i.e., the acrylate ester monomers, that are employed as the comonomer with the foregoing heterocyclic N-vinyl monomers, have the following formula:

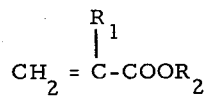

wherein $R_1$ is H or methyl, and $R_2$ is an alkyl of from 1 to 8 carbon atoms; i.e., methyl, ethyl, propyl, butyl, pentyl, hexyl, heptyl and octyl. Methyl acrylate and ethyl acrylate are, however, preferred as the monomers since they are more readily available at a reasonable price. The higher alkyl acrylates; i.e., propyl, butyl or 2-ethylhexyl acrylates or methacrylates, give very little, if any, advantage in the final polymer product. It is also possible to obtain desirable spongy polymer materials by employing vinyl acetate or vinyl propionate in the amount of up to 30–40 percent by weight with 60–70 percent by weight of any one of the above illustrated heterocyclic N-vinyl monomers. Similarly, blends of the acrylate ester monomers such as methyl, ethyl, propyl, or butyl methacrylate, may be employed. The monomer blend may also contain up to 20 percent hydroxyethyl methacrylate, or up to 20 percent methyl methacrylate, or it may contain acrylamide or methacrylamide in amounts not to exceed 30 percent of the total monomer blend. These monomers tend to increase the molecular weight of the final polymer and can be used to modify its hardness and water absorption characteristics.

The polyethylene glycol dimethacrylates that are employed as the cross-linking agents are characterized by the following formula:

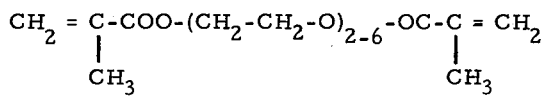

and include the following representative species:
Diethylene glycol dimethacrylates
Triethylene glycol dimethacrylate
Tetraethylene glycol dimethacrylate
Pentaethylene glycol dimethacrylate
Hexaethylene glycol dimethacrylate
and the preferred species being tetraethyleneglycol dimethacrylate or a blend of a 50—50 mixture by weight of tetraethyleneglycol dimethacrylate and triethylene glycol dimethacrylate.

The spongy polymer materials prepared in accordance with the present invention are extremely resistant to steam, hot inorganic acids and bases, chemical gases, such as sulfur dioxide and trioxide; micro organisms and the common enzymes. In other words, they are very stable to chemical reagents; i.e., very inert and will not deteriorate or decompose in contact therewith.

The following examples will show how the spongy polymer materials of the present invention are prepared. All parts given are by weight unless otherwise noted.

EXAMPLE I.

Into a one liter, four-neck flask equipped with mechanical stirrer, thermometer, nitrogen inlet and reflux condenser, after a thorough nitrogen purge, the following reactants were charged:

| | |
|---|---|
| N-vinyl-2-pyrrolidone | 80 grams |
| Methyl acrylate | 20 grams |
| Tetraethyleneglycol dimethacrylate | 1.0 grams |
| Azobisisobutyronitrile | 1.0 grams |
| N-octane (boiling point 125° C. at 760 mm.) | 400 mls. |

The clear solution was heated under agitation while maintaining a mild nitrogen purge to a temperature of 50° C. for three hours to yield a slightly viscous cloudy dispersion.

The viscous mass was poured into a laboratory size glass casting cell consisting of two pieces 8 × 12 inch plate glass, one-fourth inch thick, clamped to a three-sixteenths inch thick vinyl gasket in the conventional manner well known to those skilled in the art. The mold was heated to 50° C. overnight for an additional 16 hours, resulting in a soft and opaque spongy mass. Polymerization and cross-linking were continued by gradually heating the mold and its contents to 100° C. during a three hour period and holding at that temperature for an additional two hours to complete the polymerization reaction.

The resulting opaque and porous mass was immersed in a water bath and allowed to swell and the octane removed by hand squeezing. The octane was syphoned from the water bath and the water soaked spongy mass removed and the water substantially removed by passing through rollers.

The spongy material was then dried overnight in an air oven heated to 100° C. The dried spongy mass is highly absorbent and is suitable for sponging aqueous solutions as well as organic solvents.

EXAMPLE II.

A solution of vinyl pyrrolidone, methyl acrylate, tetraethylene glycol dimethacrylate and azobisisobutyronitrile in n-octane, as shown as starting composition in Example I, was filled directly into a glass cell casting mold as in Example I, but without prior heating or pre-polymerization.

The filled mold was heated in an oven for 24 hours at 50°–55° C., resulting in an opaque soft polymer, which was further polymerized by heating the mold to 100° C. for three hours. The resulting soft, opaque and porous mass was treated in a water bath as in Example I, and dried to produce a spongy mass very similar to that obtained in Example I.

EXAMPLE III.

Example II was repeated with the exception that N-vinyl-2-pyrrolidone was replaced by the same amount, i.e., 80 grams, of N-vinyl-2-piperidone. The resulting dry spongy mass readily absorbed water, aliphatic liquid hydrocarbons, animal blood and aqueous dispersions of protein colloids.

EXAMPLE IV.

Example II was again repeated with the exception that the N-vinyl-2-pyrrolidone was replaced by the same amount, i.e., 80 grams, of N-vinyl-E-caprolactam. The resulting dry and spongy mass readily absorbs water, aqueous solutions of inorganic salts and various organic solvents.

EXAMPLE V.

A mixture consisting of 90 grams of N-vinyl-pyrrolidone, 10 grams of ethyl acrylate, 0.4 grams of azobisisobutyronitrile and 10 grams of triethylene glycol dimethacrylate was dissolved by stirring in 350 mls. of U.S.P. grade water white mineral oil. Dissolved air was then removed by evacuation, and the solution poured into a conventional glass casting cell. The cell was heated in the absence of air to 50° C., and held at this temperature for 24 hours. An opaque, porous mass was obtained, which upon further heating in the cell at 120° C., for a period of 1 hour, yielded a firm and rigid gel which was passed slowly through rollers submerged in water until the mineral oil was removed. The resulting hydrogel was squeezed through rollers at room temperature until a substantial part of the water was removed and the spongy mass dried at 100° C. for 8 hours.

EXAMPLE VI.

Example V was repeated with the exception that the amounts of N-vinyl-2-pyrrolidone and ethyl acrylate were changed to 60 and 40 grams, respectively, and the other components remained the same. The dried spongy mass is swellable in water (overnight) to a water content of 60.8 percent.

EXAMPLE VII.

Into a casting cell as described in Example I, the following reactants were charged:

| | |
|---|---|
| N-vinyl-3-morpholinone | 85 grams |
| n-propyl acrylate | 15 grams |
| Hexaethyleneglycol dimethacrylate | 2 grams |
| Azobisisobutyronitrile | 0.4 grams |

The foregoing mixture of reactants was then dissolved in 400 mls. of U.S.P. grade white mineral oil and the mixture treated in the same manner and conditions as in Example II. The resulting dry spongy material absorbs water, mineral oil, blood, etc.

EXAMPLE VIII.

Example VII was repeated with the exception that the N-vinyl-3-morpholinone was replaced by 85 grams of N-vinyl-glutaramide. The product has the same characteristics as in Example I.

EXAMPLE IX.

Example II was repeated, but replacing the n-octane with an equal weight of distilled water. After completion of polymerization in the casting cell, as in Example II, a very sticky, clear, transparent gelatinous mass was obtained in the mold. After removing the top plate of the mold, the water was allowed to evaporate at room temperature, followed by drying in an oven, while gradually raising the temperature to 100° C. during 24 hours. This resulted in a hard, rigid, clear, colorless sheet similar in appearance to "Plexiglass" polymethyl methacrylate sheet.

EXAMPLE X.

Example II was repeated, but replacing the n-octane with ethanol. After polymerization in the mold, a very tacky, clear, transparent, very tender and extremely flexible sheet was obtained which could be removed from the mold and dried, leaving a hard clear sheet as described in Example IX.

EXAMPLE XI.

Example II was repeated, but leaving out the n-octane ingredient. After polymerization in the mold, a hard, clear, rigid, glass-like sheet was obtained.

From the foregoing specification and illustrative working examples, it becomes clearly evident that by simultaneous copolymerizing and cross-linking the reactants in a liquid aliphatic saturated hydrocarbon solvent, a solvated spongy polymer material is obtained of a coherent and homogeneous structure. The latter structure is readily washable in water to displace the solvent, to remove slight monomeric impurities and readily dried to yield a highly absorbent spongy polymer material.

Interesting and useful spongy polymeric structures can also be prepared from the reactant mixture employed in accordance with the present invention by conducting the simultaneous copolymerization and cross-linking reaction by casting or molding, including compression molding of the dispersion of the reactants in the liquid aliphatic saturated hydrocarbon solvent by conventional polymerization procedures in the absence of air.

I claim:

1. The process of preparing a spongy cross-linked copolymer which comprises heating a solution in a hydrophobic liquid diluent of a mixture consisting essentially of from 30 to 90 percent by weight of a heterocyclic N-vinyl monomer containing a carbonyl functionality adjacent to the nitrogen in its heterocyclic moiety, 10 to 70 percent by weight of a comonomer selected from the class of vinyl esters and acrylate esters, 0 to 30 percent by weight of acrylamide or methacrylamide, and from about 0.5 to about 12 percent by weight, based on the total weight of the comonomer mixture of said heterocyclic N-vinyl monomer and said ester of a polyethylene glycol dimethacrylate as cross-linking agent, said heating conducted in the absence of atmospheric oxygen at a temperature ranging from ambient to about 60°C. for a period of time sufficient to yield a slightly gelled mass, followed by continued heating in an inert atmosphere to a temperature of about 100°C. for a period of 1 to 3 hours to yield an opaque self supporting spongy mass.

2. The process according to claim 1 wherein the heterocyclic N-vinyl monomer is N-vinyl-2-pyrrolidone.

3. The process according to claim 1 wherein the heterocyclic N-vinyl monomer is N-vinyl-E-caprolactam.

4. The process according to claim 1 wherein the heterocyclic N-vinyl monomer is N-vinyl-2-piperidone.

5. The process according to claim 1 wherein the heterocyclic N-vinyl monomer is N-vinyl-3-morpholinone.

6. The process according to claim 1 wherein the heterocyclic N-vinyl monomer is N-vinyl glutarimide.

7. The product prepared in accordance with the process of claim 1.

8. The product prepared in accordance with the process of claim 2.

9. The product prepared in accordance with the process of claim 3.

10. The product prepared in accordance with the process of claim 4.

11. The product prepared in accordance with the process of claim 5.

12. The product prepared in accordance with the process of claim 6.

* * * * *